UNITED STATES PATENT OFFICE.

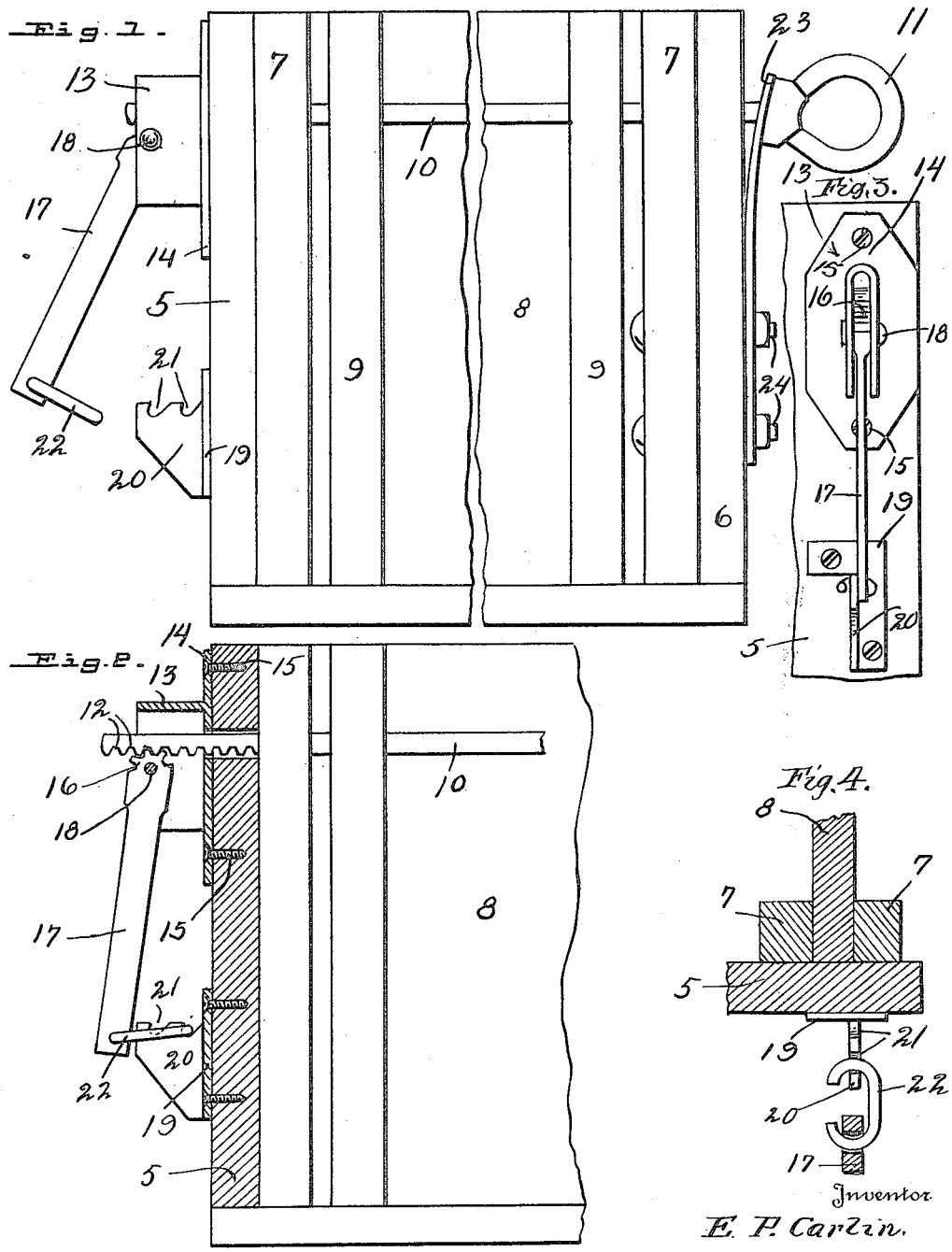

EDMUND P. CARLIN, OF LA PRAIRIE, ILLINOIS, ASSIGNOR OF ONE-HALF TO ALBERT N. CARLIN, OF ST. LOUIS, MISSOURI.

END-GATE ROD AND LOCK.

1,140,796.  Specification of Letters Patent.  Patented May 25, 1915.

Application filed July 17, 1914. Serial No. 851,614.

*To all whom it may concern:*

Be it known that I, EDMUND P. CARLIN, a citizen of the United States, residing at La Prairie, in the county of Adams, State of Illinois, have invented certain new and useful Improvements in End-Gate Rods and Locks; and I do hereby declare the following to be a full, clear, and exact description of the invention, such as will enable others skilled in the art to which it appertains to make and use the same.

This invention relates to wagons, particularly to end gates therefor, and has for its object the provision of an end gate rod and means whereby the rod may be securely locked in relation to the end gate and the wagon body so that accidental displacement thereof will be prevented.

An important object is the provision of a device of this character so constructed that it embodies a spring member whereby the parts will be held in their interlocked position with a greater degree of security and also prevented from rattling.

Another object is the provision of an end gate rod and locking means of this character so constructed that when the end gate is locked in place by the rod, the rod will exert a powerful clamping action against the sides of the wagon body, thus holding the sides firmly in relation to the end gate, thereby preventing any possible spreading of the rear portion of the body in case of severe outward strain thereon occasioned by a heavy load therein.

An additional object is the provision of a device of this character which will be simple and inexpensive in manufacture, efficient and durable in use, not liable to get out of order, and a general improvement of the art.

With these and other objects and advantages in view, the invention consists in the novel construction and arrangement of parts to be hereinafter more fully described and claimed, and illustrated in the accompanying drawing, in which—

Figure 1 is a rear elevation of a wagon body and end gate having my device applied thereto in its unlocked position, Fig. 2 is a similar view, partly in section, showing the device locked, Fig. 3 is a side elevation, and Fig. 4 is a detail horizontal section.

Referring more particularly to the drawing the numerals 5 and 6 designate the sides of a wagon body, having upon their opposed inner faces spaced cleats 7 within which is vertically slidable an end gate 8 having cleats 9 upon its rear face.

In order to lock the end gate 8 within the body, I provide a rod 10 passing through alined holes in the sides 5 and 6, cleats 7 and the cleats 9. The rod is provided upon one end with an eye or loop 11, engageable by the hand of the operator and is provided upon its other end with a plurality of teeth or notches 12 forming a rack.

Secured upon the side 5 of the body is a bracket 13, U-shaped in vertical cross section and comprising a base plate 14 secured upon the side 5 by screws or bolts 15. The toothed end of the rod 10 is disposed within the bracket 13 and is engageable by a segmental gear 16 formed upon the upper end of a locking lever 17 pivoted at 18 within the bracket.

The end gate 8 being placed in position, as shown in the drawing, the rod 10 is passed through the alined holes and into the bracket 13 while the lever 17 is held by the operator in a substantially horizontal position, after which downward movement of the lever 17 will draw the rod 10 somewhat through the bracket 13 thus clamping the rod in position and preventing its removal.

In order to hold the locking lever 17 in its downwardly swung position, I provide a retaining member or keeper secured upon the body and comprising a base plate 19 and an outstanding vertically disposed plate 20 provided with notches 21. A swinging latch 22, formed as a loop is pivoted upon and through the lower end of the lever 17 and is engageable within a selected one of said notches, whereby the lever 17 may be securely held against upward movement.

In order to provide resilience for supplying outward tension on the lever 17 to prevent disengagement of the latch 22 from any of the notches 21, and also to hold the parts against rattling, I provide a leaf spring 23 rigidly secured upon the side 6, as by bolts 24 and apertured at its upper end for the reception of the rod 10.

It will be seen that when the rod 10 is inserted in place and locked as shown and described, the outward pressure of the spring 23 against the eye or loop 11 will pull outwardly upon the lever 17, thereby preventing accidental displacement of the latch 22 from the retaining notches. It is also evident that the end gate cannot jar loose and be lost and that the sides of the wagon body are firmly clamped in relation to the end gate with the consequent strengthening of the wagon body.

It will be readily understood that I reserve the right to make various changes in the form, construction and arrangement of parts without departing from the spirit of the invention or limiting the scope of the subjoined claims.

Having thus described my invention, I claim:

1. In combination with a wagon body having an end gate thereon, means for locking said end gate in position relative to said body, said means comprising a rod extending through the body and the end gate, a rack on one end of said rod, a hand engaging loop on the other end of said rod, a bracket secured upon said body and receiving said rack, a lever pivoted within said bracket and having a segmental gear formed on its inner end and meshing with said rack, downward movement of said lever drawing said rod partially through said bracket and clamping said body against said end gate, and means for holding the free end of said lever upon said body.

2. In combination with a wagon body having an end gate thereon, means for locking said end gate in position relative to said body, said means comprising a rod extending through the body and the end gate, a rack on one end of said rod, a hand engaging loop on the other end of said rod, a bracket secured upon said body and receiving said rack, a lever pivoted within said bracket and having a segmental gear formed on its inner end and meshing with said rack, downward movement of said lever drawing said rod partially through said bracket and clamping said body against said end gate, and means for holding the free end of said lever upon said body, said means comprising a plate secured upon the body and provided with a plurality of notches, and a latch on the free end of said lever engageable within a selected one of said notches.

In testimony whereof, I affix my signature, in the presence of two witnesses.

EDMUND P. CARLIN.

Witnesses:
J. F. Ross,
A. F. Cummings.

Copies of this patent may be obtained for five cents each, by addressing the "Commissioner of Patents, Washington, D. C."